US005869169A

United States Patent [19]

Jones

[11] Patent Number: 5,869,169

[45] Date of Patent: Feb. 9, 1999

[54] MULTILAYER EMITTER ELEMENT AND DISPLAY COMPRISING SAME

[75] Inventor: Gary W. Jones, Lagrangeville, N.Y.

[73] Assignee: FED Corporation, Hopewell Junction, N.Y.

[21] Appl. No.: 722,490

[22] Filed: Sep. 27, 1996

Related U.S. Application Data

[60] Provisional application No. 60/004,606 Sep. 29, 1995.

[51] Int. Cl. [6] .................... B32B 7/02; H01J 1/02

[52] U.S. Cl. .................... 428/213; 313/310; 313/336; 313/346 R; 313/352

[58] Field of Search .................... 313/495, 310, 313/336, 293, 309, 351, 352; 428/172, 213, 167, 446, 689, 702; 445/50, 51

[56] References Cited

U.S. PATENT DOCUMENTS 5,090,932 2/1992 Dieumegard et al. .................... 445/24
5,316,511 5/1994 Lee .................... 445/24
5,527,200 6/1996 Lee et al. .................... 445/50
5,610,478 3/1997 Kato et al. .................... 315/169.1
5,656,883 8/1997 Christensen .................... 313/320

*Primary Examiner*—Donald Loney
*Attorney, Agent, or Firm*—Collier, Shannon, Rill & Scott, PLLC

[57] ABSTRACT

A field emitter element comprising a bottom layer of material shaping the overall emitter element, and a top layer of low work function material or otherwise of high electron emissivity characteristic. The low work function top layer preferably is shaped to a sharp point. The bottom layer may be formed of a material such as tantalum, molybdenum, gold, or silicon (or alloys thereof), and the top layer may be formed of a material such as $Cr_3Si$, $Cr_3Si_2$, $CrSI_2$, $Nb_3Si_2$, Nb, $Cr_2O_3$ or SiC. In a specific aspect, at least one of the first and second emitter materials is chromium oxide ($Cr_2O_3$). In another variant, the first emitter material is an insulator of leaky dielectric, e.g., SiO with a 10–60% Cr by weight based on the weight of SiO, and the second emitter material is SiO+50–90% Cr by weight, based on the weight of SiO.

16 Claims, 1 Drawing Sheet

MULTILAYER EMITTER ELEMENT AND DISPLAY COMPRISING SAME

CROSS-REFERENCE TO RELATED APPLICATION

The priority of U. S. Provisional patent application Ser. No. 60/004606 filed Sep. 29, 1995 is hereby claimed.

BACKGROUND OF THE INVENTION

1. Field of the Invention

This invention relates to a multilayer field emitter element and to a display assembly comprising same.

2. Description of the Related Art

In the fabrication of field emitter devices, wherein cavities are formed in a base structure comprising a gate electrode member circumscribingly overlying the cavities and the emitter tip elements are formed in the cavities by suitable deposition of emitter material, the excess emitter material employed to form the tip elements must be removed from the gate layer in order to open the cavity and expose the emitter tip element for its subsequent use as an electron emitter when the tip element therein is energized by imposition of a potential difference thereon.

In such fabrication, the deposition on the gate of the emitter material during formation of the emitter elements can impose on the gate significant stresses which may in some instances resulting in cracking, propagation of stresses in the structure of the field emitter article which may damage the structure or components thereof, or causing the subsequent liftoff of the excess emitter material disproportionately more difficult. Materials which might otherwise overcome such mechanical and morphological difficulties are typically unsatisfactory or less desirable as emitter element materials of construction.

There is therefore a need in the art for an improved emitter fabrication and materials which overcome the aforementioned difficulties.

SUMMARY OF THE PRESENT INVENTION

The invention in a broad aspect relates to the use of an emitter structure comprising two or more sequential layers, in a construction which minimizes the susceptibility of the gate to stress and cracking prior to liftoff of the excess emitter material, while still providing a highly emissive sharp emitter tip.

In one embodiment, the invention comprises a field emission emitter element comprising a lower layer of material which is employed to shape the overall emitter element, and to reduce stress in the gate liftoff layer, and an overlying layer of low work function material which renders the emitter less susceptible to adverse ion bombardment effects resulting from subsequent ion etching typically practiced in the formation of the field emission structure comprising the emitter element. The low work function layer overlies the lower layer, and may be contiguous in relation to the lower layer, or may alternatively be arranged with an interposed dielectric layer or other material layer between a top low work function material layer and a bottom emitter material layer.

The low work function layer in the emitter structure of the invention is an integral structural moiety of the emitter, not simply a coating on the emitter element. In the present invention, the top layer of low work function material is shaped into a sharp point, rather than the blunting which otherwise would occur when an emitter tip is coated with a low work function material. Thus the low work function material layer is significantly thicker in the vertical direction at the central axis of the emitter, at the upper tip portion of the emitter, than it is at lower sections of the low work function material layer (downwardly and radially outwardly from the central axis of the emitter).

Another aspect of the invention relates to a field emission emitter element comprising a bottom layer of a first emitter material and a top layer of a second emitter material, optionally with other layers between the bottom and top layers, wherein one of the first and second emitter materials is chromium oxide ($Cr_2O_3$).

Various other aspects, features, modifications, and embodiments are contemplated within the scope of the invention, including the illustrative embodiments disclosed more fully hereinafter.

DESCRIPTION OF THE INVENTION AND PREFERRED EMBODIMENTS AND ASPECTS THEREOF

Figure 1:
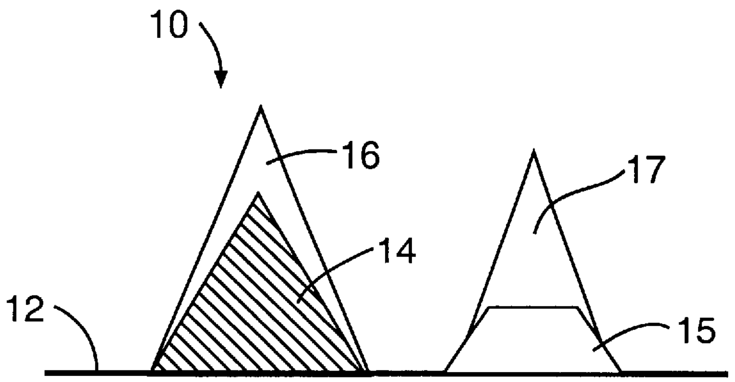
FIG. 1 is a schematic side elevational section view of an emitter according to one embodiment of the present invention.

The present invention is based on the discovery that field emitter device structures may be advantageously fabricated by constructing the emitter elements of a multilayer composition, with differing materials in the respective layers, to achieve significant structural and operational advantages over prior art emitters of unitary homogeneous composition and construction.

In one aspect, the invention relates to an emitter element comprising a bottom layer of a material which in deposition on the gate of the emitter device structure serves to minimize stress and cracking of the gate prior to liftoff removal of excess emitter material, and a top layer which is fabricated of a low work function emitter material resistant to adverse ion bombardment effects, and sharpenable to a sharp point at the upper terminus of the emitter element.

In another aspect, the invention relates to a field emission emitter element comprising a bottom layer of a first emitter material and a top layer of a second emitter material, optionally with other layers between the bottom and top layers, wherein at least one of the first and second emitter materials is chromium oxide ($Cr_2O_3$).

The use of chromium oxide ($Cr_2O_3$) as a material of construction for a field emission emitter element constitutes a highly unobvious aspect of the invention, since such material would logically be rejected as a candidate material of construction for emitter elements based on the high work function characteristic of such oxide material, as well as the high resistivity of such material.

Despite these ostensibly disfavorable characteristics, it has been surprisingly and unexpectedly discovered that such material is very effective as an emitter material of construction. Although chromium oxide ($Cr_2O_3$) has a poor work function characteristic, and is in fact is used in many microelectronics applications for stopping electrons or otherwise attenuating electron flux, it has been found that such oxide is highly processable to form very low radius of curvature tip conformations, and that such sharp tip geometry can overcome the otherwise severely disadvantageous high work function characteristic of the material. Thus, a sharp tip may be formed of a chromium oxide ($Cr_2O_3$) layer of an emitter element and such sharp tip in fact provides a higher emissivity characteristic than low work function materials. In fact, chromium oxide ($Cr_2O_3$) tips may be formed or sharpened to provide tips with a low (Angstrom-size) radius of curvature providing very high electron emissivity character. Thus, the chromium oxide ($Cr_2O_3$) material may be used as a material of construction for one or more than one of the layers in emitter tips of a multilayer type, e.g., the bi-layer emitter tip schematically shown in FIG. 1 hereof, as hereinafter more fully described, as a material for either the top or bottom layer in such composite structure.

The chromium oxide ($Cr_2O_3$) material in such application as an emitter element material of construction, thus conformationally overcomes the highly disadvantageous work function characteristic, and the emitter element formed in part of such material is able to take advantage of the other favorable characteristics of chromium oxide ($Cr_2O_3$). For example, chromium oxide ($Cr_2O_3$) has good conductive properties and good stress characteristics, as well as being highly passivating and non-reactive in nature.

More generally, field emitter devices of the invention may comprise a substrate formed for example of glass, Mylar, ceramic or any other suitable material. On the substrate is a conductor layer, which may be formed of conductive metal such as aluminum, silver, chromium, etc. The conductor layer is coupled in electron emission-stimulating relationship with an array of emitter elements so that when the conductor layer is energized, via circuit forming connection with a power source, the emitter elements arrayed across the surface in the device will emit electrons at the upper tip extremities. The emitter elements in the array are arranged in holes or wells defined by an insulator layer, which may be formed for example of SiO, $SiO_2$, polyimide, or other suitable insulation material. The emitter elements are in spaced relationship to a phosphor or anode plate, which in impact by electrons emitted by the field emitter elements, produce illumination.

An emitter structure comprising 2 or more sequential layers of can be used to minimize stress and cracking of the gate prior to liftoff of the excess emitter material, while still providing a highly emissive sharp emitter tip. This is distinctively different from a coated emitter tip in that a substantial portion of the upper part of the emitter is built from the low work function emitter material, and therefore the emitter is less susceptible to ion bombardment. The upper portion is also shaped into a sharp point rather than the blunting as would occur when sharp tips are coated.

During the portion of the process where the emitter material is evaporated, an initial layer of a ductile, but low surface mobility material is evaporated. Example bottom layer materials are pure tantalum, molybdenum, and gold, although less ductile materials can be used such as silicon if the evaporation is performed slowly to minimize stress (e.g., 0.3 nm/min). This material must withstand the liftoff process and 450 degree C. sealing processes in air without significant loss of shape of adhesion. This relieves the stress from the deposition and therefore minimizes the possibility of gate cracking. Such construction differs from the shallow angle release layer used in prior art emitter fabrication techniques, in that the layer employed in the practice of the present invention is not a release layer, but a permanent part of the emitter structure. A second layer is then deposited of a low work function material with a high surface sticking coefficient during evaporation. Examples of suitable materials for the low work function material layer are $Cr_3Si$, $Cr_3Si_2$, $CrSi_2$, $Nb_3Si_2$, Nb, and SiC.

This low work function material also must withstand the liftoff process and 450 degree C. sealing processes in air without significant loss of shape or adhesion.

The materials are optionally and preferably oxidized to prepare the surface for low work function emission and contamination insensitivity.

FIG. 1 is a schematic side elevational section view of an emitter 10 according to one embodiment of the present invention, comprising an emitter including bottom material layer 14 and top low work function material layer 16, with the emitter being formed on the substrate 12. Adjacent the emitter 10 is another emitter comprising a bottom layer 15 of generally frustoconical shape, and an overlying top layer 17, of an alternative conformation.

Figure 2:
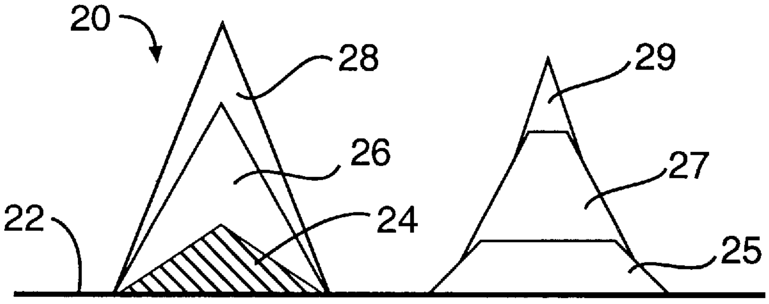
FIG. 2 is a schematic side elevational section view of an emitter according to another embodiment of the present invention.

FIG. 2 is a schematic side elevational section view of an emitter 20 according to another embodiment of the present invention, comprising an emitter including bottom material layer 24, intermediate dielectric layer 26, and top low work function material layer 28, with the emitter being formed on the substrate 22. Adjacent such emitter is another emitter element, comprising bottom layer 25 of generally frustoconical shape, an intermediate layer 27 of generally frustoconical shape, and top layer 29 of generally conical shape, as shown.

Figure 3:
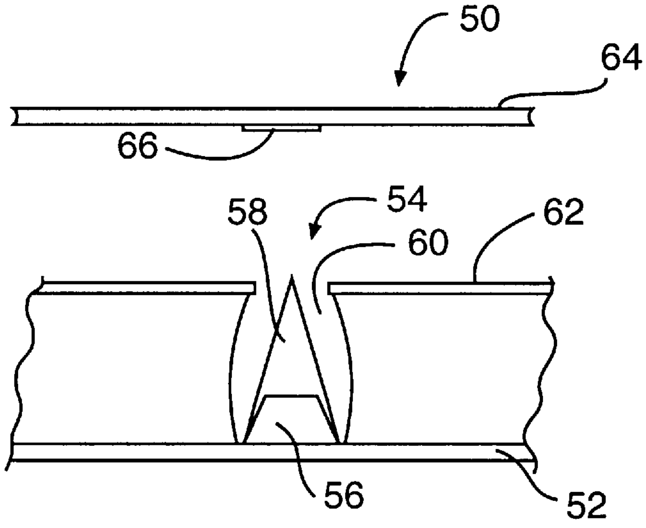
FIG. 3 is a schematic elevational view of a portion of a flat panel display device utilizing a composite emitter structure of the present invention.

FIG. 3 is a schematic elevational view of a portion of a flat panel display device 50 utilizing a composite emitter structure of the present invention. As shown, the device 50 comprises a substrate cathode plate 52 having formed thereon a composite emitter 54 of the present invention. The composite emitter 54 comprises a lower layer 56 of a first material of construction, and an upper layer 58 of a second material of construction. The emitter 54 is surrounded by a dielectric layer defining therein a cavity 60 surrounding the emitter 54 as shown. On the dielectric layer is a gate electrode 62. The emitter 54 may be constructed with an addressable x-y grid (not shown) in relationship thereto, for imposing a voltage of appropriate magnitude on the emitter element for emission of electrons. The cathode plate 52 is arranged in spaced relation to an anode plate 64, with the anode plate comprising electroluminescent elements 66 which when impinged on by electrons from the emitter element arranged in register therewith, produces an illumination event at the specific pixel or region of the anode plate.

A forming gas treatment (e.g., plasma or >350 deg C. 10%$H_2$ in $N_2$ treatment) can be used in the fabrication of the emitter structure of the invention, after the oxidation to partially reduce unstable surface oxides and optimize the surface structure, although care should be taken to not remove the primary surface oxides.

A preferred version of the above structure may be built using a insulator of leaky dielectric as the base material, while still using the top surface electron emissive coating. This novel type device may be used to further limit current at the emitter by restricting electron current to a thin outer conductive or partially conductive wall. The bottom layer may be built from SiO with a 10–60% Cr content, by weight based on the weight of SiO. The top layer may comprise SiO+50–90% Cr, on the same SiO weight basis. A third stress relief layer with improved contact resistance may be used under the dielectric layer (e.g., 100 nm Ta or Mo).

While the invention has been described herein, with reference to various illustrative features, aspects, and embodiments, it will be recognized that the invention is susceptible of numerous variations, modifications and other embodiments, and the invention therefore is to be broadly construed, as encompassing all such variations, modifications and alternative embodiments, within its spirit and scope.

I claim:

1. A field emitter comprising.

a bottom layer of emitter material; and a top layer of formed from a low work function emitter material, wherein said top layer has a thickness in a vertical direction in an area adjacent a central axis of said emitter element that is significantly greater than the thickness of said top layer in an area that is spaced from said central axis.

2. A field emitter element according to claim 1, wherein the low work function top layer is in contiguous relation to the bottom layer.

3. A field emitter element according to claim 1, wherein the low work function material top layer is separated from the bottom layer of material by an interposed dielectric layer therebetween.

4. A field emitter element according to claim 1, wherein the low work function top layer is shaped to a sharp point.

5. A field emitter element according to claim 1, wherein the bottom layer is formed of a material selected from the group consisting of tantalum, molybdenum, gold, and silicon.

6. A field emitter element according to claim 1, wherein the top layer is formed of a material selected from the group consisting of $Cr_3Si$, $Cr_3Si_2$, $CrSi_2$, $Nb_3Si_2$, Nb, $Cr_2O_3$ and SiC.

7. A field emitter element comprising:

a bottom layer of a first emitter material;

a top layer of a second emitter material; and at least one other layer between said bottom layer and said top layer, wherein said top layer has a thickness in a vertical direction in an area adjacent a central axis of said emitter element that is significantly greater than the thickness of said top layer in an area that is spaced from said central axis.

8. A field emitter element according to claim 7, wherein one of said first and second emitter materials is a material selected from the group consisting of tantalum, molybdenum, gold, and silicon.

9. A field emitter structure including a field emitter element, said field emitter element comprising:

a bottom layer of a first emitter material;

a top layer of a second emitter material; and at least one other layer between said bottom layer and said top layer, wherein said top layer has a thickness in a vertical direction in an area adjacent a central axis of said emitter element that is significantly greater than the thickness of said top layer in an area that is spaced from said central axis.

10. A field emitter structure according to claim 9, wherein the first emitter material is SiO with a 10–60% Cr content by weight, based on the weight of the SiO, and the second emitter material is SiO+50–90% Cr, based on the weight of SiO.

11. A field emitter structure according to claim 9, further comprising a stress relief layer under the bottom layer of first emitter material.

12. A field emitter structure according to claim 11, wherein the stress relief layer is formed of a material selected from the group consisting of tantalum and molybdenum.

13. The field emitter element according to claim 7, wherein at least one of said first emitter material and said second emitter material is chromium oxide ($Cr_2O_3$).

14. The field emitter element according to claim 7, wherein said top layer is shaped to a sharp point.

15. The field emitter element according to claim 9, wherein said first emitter material is an insulator of leaky dielectric.

16. The field emitter element according to claim 9, wherein said top layer is shaped to a sharp point.

* * * * *